UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ALUMINOUS COMPOSITION AND METHOD OF PREPARING THE SAME.

1,257,356.  
Specification of Letters Patent.  
Patented Feb. 26, 1918.

No Drawing.  Application filed November 14, 1917.  Serial No. 202,074.

*To all whom it may concern:*

Be it known that I, OTIS HUTCHINS, a citizen of the United States, residing in Niagara Falls, in the county of Niagara and State of New York, have invented certain new and useful Improvements in Aluminous Compositions and Methods of Preparing the Same, of which the following is a full, clear, and exact description.

This invention contemplates the manufacture of an improved aluminous composition or abrasive and an improved method of making same, by means of an electric furnace process. The electric furnace process is well understood by those versed in the art and may be that described in the Tone Patent No. 1,002,608, dated September 5, 1911.

Practically all commercial aluminous abrasives have an alumina content of 92 to 98%, the remainder being oxids of titanium, silica, iron, calcium and magnesium. The alumina for the most part appears in the form of alumina crystals, the other oxids present forming a glass which acts as a matrix holding the alumina crystals together. The cutting power of the abrasive depends upon the size and shape of the alumina crystals and upon the amount and quality of the surrounding matrix. The size of the alumina crystals can be controlled by controlling the length of time of solidification of the molten abrasive and also by the composition of the matrix holding together the alumina crystals.

For certain kinds of grinding, such as the snagging of steel castings, an exceedingly tough abrasive grain is required. A grain suitable for this work may consist of relatively small alumina crystals cemented together by means of an exceedingly tough matrix. I have discovered that an abrasive having such characteristics can be produced by the introduction of barium oxid into aluminous fusions such as are now used for the manufacture of abrasives. The effect of barium oxid, even in small amounts, is very marked causing the alumina to crystallize in small crystals and producing a matrix of exceeding toughness. This is due to the fact that the presence of barium oxid tends to cause an intertwining and interlocking of the crystals. In this respect, there is a great difference between the action of barium oxid and the action of calcium oxid, which has heretofore been present in some of the aluminous abrasives of this general class of abrasives. The effect of calcium in the crystallization of alumina as it cools from a fused melt is to prevent the crystal growth in the form of branching and interlocking crystals, and to produce crystals having flat faces and in many cases a regular hexagonal outline. Such crystals are in general of nearly the same diameter in all directions in the crystal plane.

In the preferred method of carrying out my invention, I fuse in an electric furnace a bauxite containing barium oxid in appreciable quantities, adding enough carbon to reduce the major portion of the iron, silica and titanium oxids, but insufficient to reduce the barium oxid. As an illustrative example, I have obtained good results by using a natural bauxite of the following composition:—

| | |
|---|---|
| $Al_2O_3$ | 57.20 |
| $Fe_2O_3$ | 3.64 |
| $SiO_2$ | 3.84 |
| $TiO_2$ | 5.18 |
| $BaO$ | .23 |

The product, in addition to the alumina, contained the following:

| | |
|---|---|
| $SiO_2$ | .24 |
| $FeO$ | .69 |
| $TiO_2$ | 2.18 |
| $BaO$ | .30 |

This product has an exceedingly fine grained structure and exhibited great resistance toward crushing.

In the practice of my invention, I do not limit myself to the use of this particular bauxite, nor to a bauxite containing barium oxid. If preferred barium oxid may be added to bauxite containing none, or an insufficient amount, of this compound. I may also add barium oxid, or barium compounds producing barium oxid, upon calcination, to other aluminous ores or aluminous material suitable for the manufacture of aluminous abrasives.

I claim:

1. A crystalline aluminous product containing barium oxid.

2. An aluminous abrasive containing oxids of silicon, iron, titanium and barium.

3. An aluminous abrasive consisting of alumina crystals held together by a matrix containing oxids of silicon, iron, titanium and barium.

4. An aluminous abrasive containing oxids of silicon, titanium and barium.

5. The method of making an aluminous abrasive which consists in fusing in an electric furnace a mixture of bauxite containing barium oxid, and carbon, the carbon being present in sufficient quantity to reduce the major portion of the iron, silicon and titanium oxids.

6. The method of making an aluminous abrasive which consists in fusing in an electric furnace a mixture consisting of an aluminous material, barium oxid or a barium compound which upon calcination yields barium oxid, and carbon, the carbon being present in sufficient quantity to reduce the major portion of the silica, iron and titanium oxid, but insufficient to reduce the barium oxid.

In testimony whereof, I have hereunto set my hand.

OTIS HUTCHINS.